Figure 1:
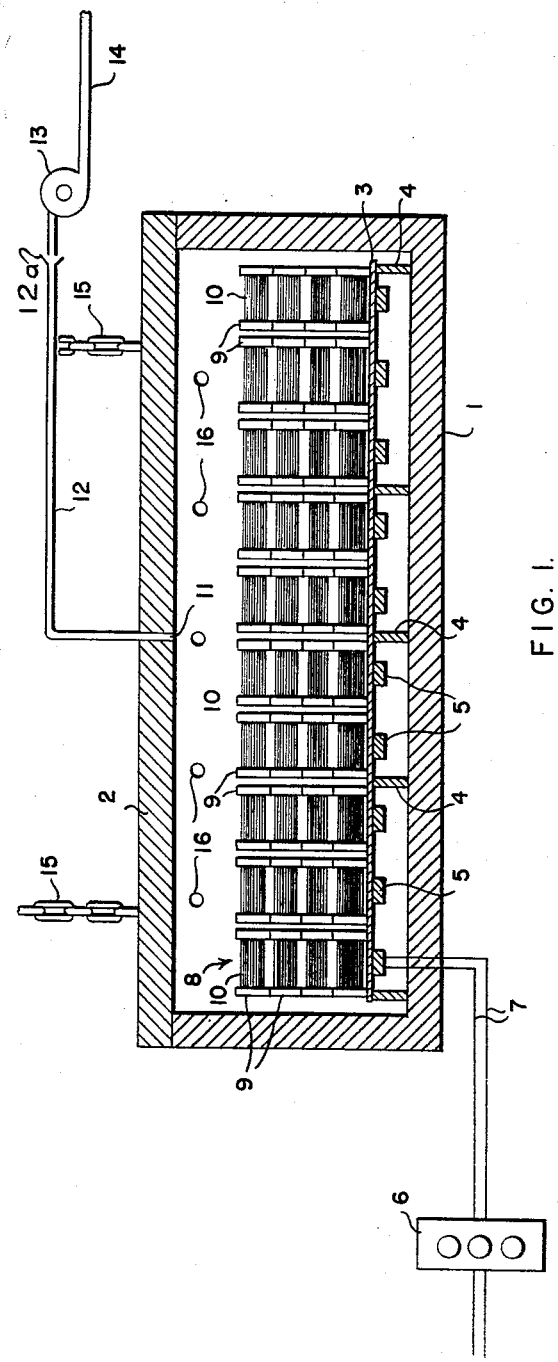

June 2, 1959    E. J. HOUDRY ET AL    2,889,288
METHOD FOR THE MANUFACTURE OF CATALYSTS
Filed April 2, 1953

INVENTORS.
EUGENE J. HOUDRY &
BY   JAMES W. HARRISON

ATTORNEY

United States Patent Office 2,889,288
Patented June 2, 1959

2,889,288

METHOD FOR THE MANUFACTURE OF CATALYSTS

Eugene J. Houdry, Ardmore, Pa., and James W. Harrison, Woodbury, N.J., assignors to Oxy-Catalyst, Inc., a corporation of Pennsylvania Application April 2, 1953, Serial No. 346,484

5 Claims. (Cl. 252—463)

This invention is concerned with an improved method for the production of certain types of catalysts. Specifically, the invention is concerned with the preparation of catalyst containing or made up of catalytic inorganic oxides such as of catalytic alumina, magnesia, beryllia, thoria, silica or the like, or mixtures of such oxides as a silica-alumina composite. Often, such catalytic oxides may have catalytic activity of themselves, such as a silica-alumina hydrocarbon cracking catalyst, or in other cases, the catalytic oxide may serve as a carrier for another catalytic material. Catalytic alumina, for example, impregnated with platinum is an excellent oxidation catalyst.

In the preparation of such catalysts, one of the main problems is the production of a catalytic structure having the proper physical characteristics to withstand relatively severe conditions of use. In particular, it is desirable to have a catalytic structure which is relatively hard, and which has good resistance to shocks, both mechanical and thermal, and resistance to attrition, abrasion and the like. Since these catalytic oxides are inherently porous in character, the problem of preparing a catalytic structure which possesses these desirable physical characteristics and at the same time retains its catalytic activity is an especially difficult one.

Such a problem is encountered for example in the preparation of a catalytic structure such as that described in copending application Serial No. 312,152, filed September 29, 1952, now Patent No. 2,742,437, for Catalytic Structure and Composition, by Eugene J. Houdry. The structure described in this application includes an inert support on which is deposited a relatively thin, adherent film of catalytic alumina or similar inorganic oxide. Unless the film of oxide is tightly adherent to the support, and is relatively hard and resistant to abrasive, erosive and similar influences, the life of this type of catalytic structure is relatively short particularly, since the thickness of the film may be only of the order of .003″. Similarly, in the preparation of pellet-type catalysts, such as a molded pellet of catalytic alumina, or a molded pellet of silica-alumina, it is imperative that the pellet have a relatively high resistance to mechanical and thermal shock, attrition, abrasion and so forth if the catalyst is to last any appreciable time under severe conditions of use.

It has been previously found that the physical properties of such catalytic structures can be considerably improved by deposting, molding, or otherwise shaping the catalytic oxide into a coherent mass consisting of finely divided particles of the oxide homogeneously moist with an aqueous solution of a compound decomposable into a catalytic inorganic oxide, and thereafter drying the structure thus prepared, and decomposing the compound to the oxide form. For example, in the preparation of a catalytic film of alumina on an inert support, the support may be dipped into a slurry consisting of finely divided alumina, dispersed in an aqueous solution of an aluminum salt such as aluminum nitrate. By this method, which is more fully described in United States Patent 2,580,806, a film of finely divided alumina particles, homogeneously moist with a solution of aluminum nitrate, is deposited on the support. After drying, and decomposition of the aluminum nitrate, a relatively hard and tightly adherent film of catalytic alumina is produced. Similarly, pellets of catalytic alumina of superior hardness may be produced by molding finely divided alumina wet with an aqueous solution of aluminum nitrate so as to produce a pellet which is homogeneously moist with the aluminum nitrate solution. After drying and decomposition of the aluminum nitrate into catalytic alumina by heat, a pellet of relatively good hardness and resistance to attrition is obtained. Apparently, the increase in the hardness of the catalysts produced by this method is due to the decomposition of the aluminum nitrate or other similar compound in situ. It is believed that this compound as it decomposes, tends to weld or bind the discreet particles of catalytic oxide to one another thus forming a closely knit, physically strong mass.

It has now been found, that in practicing the above described method, the technique employed for drying the moist structure is of critical importance with respect to the physical characteristics of the finished catalyst. Apparently the binding or welding effect produced by the decomposition of the metal salt or other compound into the catalytic oxide is very significantly affected by this factor.

Whatever the underlying reason, it has been discovered that when the conditions under which the moist structure is dried are carefully controlled in the manner hereafter described considerably superior results are obtained. Briefly this critical drying technique involves conducting the drying operation in an atmosphere which is very nearly saturated with water vapor and preferably at the same time controlling the application of heat such that during drying there are substantially no temperature gradients in the catalytic structure being dried. Usual drying techniques, such as slow drying at atmospheric conditions, or heating in a standard convection type oven, or even relatively slow drying in a fairly moist atmosphere, as practiced in the ceramic arts fail to give the improvement in physical properties obtained by the use of this special technique.

According to the preferred method for carrying out this technique, the catalytic structure to be dried is heated in an enclosed space and the moisture evaporating from the structure is permitted to accumulate so that the atmosphere in the enclosure becomes very nearly saturated with water vapor. The release of vapor from the enclosure is controlled so that during the drying operation the atmosphere therein remains at all times just below its saturation point. This may be very conveniently accomplished by providing a small vent in the drying enclosure and permitting the accumulating water vapor to escape to the atmosphere through this vent by virtue of slight positive pressure created in the enclosure by the evaporating vapor. For good results and reasonably rapid drying, the catalytic structure is brought up to a temperature of from 200°–220° F. and permitted to remain at this temperature until evaporation of free water is complete.

Figure 2:
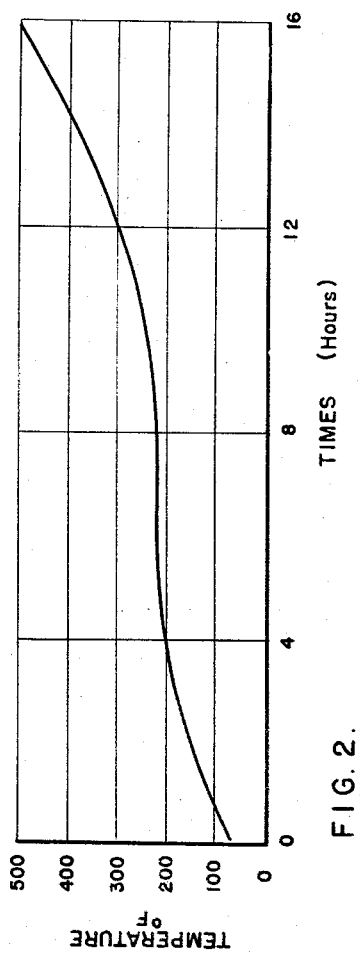

For a better understanding of the invention, reference is now made to the accompanying drawings in which:

Fig. 1 is a diagrammatic illustration of one form of an apparatus suitable for carrying out the invention; and, Fig. 2 is a graph illustrating a typical time-temperature curve obtained when using the method of the invention in connection with the type of apparatus illustrated in Fig. 1.

Referring now to Fig. 1, reference numeral 1 refers to a drying oven constructed of a suitable insulating material and provided with a removable cover 2. Within the oven, a metal plate 3 is provided, supported upon beams 4. Insulated electrical heating elements 5 are uniformly arranged along the under surface of the metal plate 3 so as to provide a uniform source of heat for the oven. Current is supplied to the element 5 through a suitable control unit 6 and leads 7.

In the roof of the oven a single small vent 11 is provided communicating with a small line 12 for conducting the evaporated moisture and any other vaporous products from the heating oven. Line 12 terminates in a flared opening 12a. A small blower 13 is provided to collect the vapors issuing from line 12 and to force these vapors through line 14 to the external atmosphere. The blower 13 is not intended to create a negative pressure in the drying oven, but is merely provided to collect the vapors and conduct these to the external atmosphere.

In order to provide access to the interior of the oven for loading and unloading, hoist chains 15 are provided connected to an overhead hoist (not shown). Openings 16 on the back wall of the oven are provided for admitting purge air at the end of a drying cycle. These openings 16 are closed during the drying operation.

For the purposes of illustration, the oven is shown loaded with catalytic units generally designated by the reference numeral 8. Each of these catalytic units comprise a pair of end plates 9 which support between them a plurality of spaced-apart elongated rod-like elements 10. Catalytic units of this type are disclosed and described more in detail in copending application Ser. No. 159,191, filed May 1, 1950, now Patent 2,730,434, for Process and Apparatus for Contacting Operations, by Eugene J. Houdry. The rod-like elements of these units are provided with a thin coat of catalytic oxide. As originally deposited, this thin film of metal oxide might consist, for example, of a film of catalytic alumina homogeneously moist with an aqueous aluminum nitrate solution.

In operation, the drying oven is loaded with moist catalyst, preferably so that the major portion of its volume is filled as illustrated in the drawing. The cover 2 is then secured in place and all openings to the atmosphere are carefully sealed with the exception of the small vent 11. Heat is then introduced at a relatively slow rate, the rate of heating being controlled by varying the current flowing through the electrical heating elements, through a suitable control device 6.

Quickly, the atmosphere in the drying oven becomes very nearly saturated with water vapor and evaporation thereafter occurs at a slow rate, determined by the rate at which water vapor escapes of its own accord through the small vent 11. A slight positive pressure builds up in the drying chamber due to the accumulation of water vapor and as a result of the slight pressure drop through line 12. Preferably, the heat input is slow enough so that there are no temperature gradients set up in the catalytic structure while drying is taking place.

After all the moisture has evaporated from the catalyst, conveniently the units may be permitted to remain in the heating oven and additional heat applied to raise the temperature to the decomposition point of the compound which has been deposited from its aqueous solution. Thus, for example, when drying a support provided with a film of catalytic alumina moist with a solution of aluminum nitrate, aluminum nitrate crystals are deposited in the film of catalytic alumina, and by heating to a temperature of approximately 400° F. the aluminum nitrate decomposes into catalytic alumina, producing fumes of nitrogen oxides which are also removed through vent 11 and line 12.

Although the operability of the invention does not depend upon this theory it is believed that the reason the method of drying is of critical importance with respect to the physical characteristics of the film or pellet of catalytic oxide is that it is necessary during the drying operation to avoid migration of the aqueous solution with which the catalyst is impregnated. In ordinary operations for drying a porous structure which contains moisture distributed throughout, as in ceramic drying, the moisture evaporated from the exterior surface of the structure is generally replaced by moisture which migrates, usually by capillary action, from the interior to the surface, there to be evaporated. In the present case, it is believed that this type of moisture migration must be prevented or at least substantially decreased to avoid depositing out a greater part of the dissolved compound on the surface of the catalyst. In the case of a catalytic film or pellet consisting of catalytic alumina moist with an aqueous solution of aluminum nitrate, for example, if a major portion of the solution migrates to the surface to be evaporated, the major portion of the aluminum nitrate crystals are deposited upon or near the surface of the film or of the pellet. It is believed that by conducting the drying operation according to the principles of this invention, that is by drying in an atmosphere very nearly saturated with water vapor and preferably at the same time avoiding any substantial temperature gradients in the catalytic structure being dried, this migration of the solution to the surface as the catalyst is dried is completely eliminated, or at least very substantially decreased. It is believed that this results in a more uniform distribution of the compound (aluminum nitrate for example) through the mass of the finely divided oxide. Upon decomposition by heat of the crystals of aluminum nitrate or other compound thus uniformly deposited, it is thought that the small particles of active alumina or other oxide thus formed in situ tend to knit the preformed particles of catalytic oxide together into a relatively hard, physically strong mass.

EXAMPLE I

This example illustrates a specific procedure, using the principles of the invention, for preparing a catalytic structure consisting of an inert support having deposited thereon a film of catalytic alumina. The inert support may be of any desired configuration, but for the purpose of this example, units similar to the unit 8 shown in the drawing were employed. Each unit consists of a pair of porcelain end plates supporting between them several dozen spaced-apart rod-like elements also composed of porcelain. As mentioned previously, these units are more particularly described in copending application Ser. No. 159,191, filed May 1, 1950. The spaced-apart porcelain rods between the end plates are composed of a high quality relatively dense porcelain, the particular porcelain used in this example having about 20 percent voids in the form of submicroscopic pores. The purpose of the procedure hereafter described is to provide these porcelain rods with a thin, tightly adherent coat of catalytic alumina.

To deposit the alumina coating on the surface of these rods a specially prepared slurry was employed. This slurry was produced by first subjecting a calcined catalytic alumina powder ground to about 300 mesh to a wet grinding operation in an aqueous vehicle in an attrition type colloid mill, until the particle size of the alumina was reduced largely to the micron or submicron range. This colloiding operation is more fully described in copending application Ser. No. 340,230, filed March 4, 1953, now abandoned, for Catalyst Manufacture, by Eugene J. Houdry. The colloidized alumina in its aqueous vehicle, is then mixed with a sufficient quantity of a saturated solution of aluminum nitrate (635 gms. of

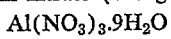
$Al(NO_3)_3.9H_2O$ per liter of solution) and a sufficient quantity of aluminum nitrate crystals to provide a slurry consisting of 1 gram of alumina particles to 2.4 cc. of saturated aluminum nitrate solution.

The porcelain catalytic units were dipped in this slurry, allowed to remain immersed for 30 seconds, removed, and then drained. The catalytic units thus provided with a deposited film of alumina moist with an aqueous solution of aluminum nitrate were loaded into an oven of the type illustrated in Fig. 1 and the entire oven was then sealed tightly except for a one-quarter inch diameter vent hole, which is connected to a vent line as illustrated in Fig. 1. The size of the heating oven was about 4' x 3' x 1½' inside dimensions and was loaded with about 450 of the units illustrated in the drawing stacked in the manner shown. Each unit was approximately 3" x 3" x 6" in size.

Power was then applied through leads 7 to the heating elements 5. The application of heat was controlled so that the temperature in the oven was brought from room temperature to about 210–220° F. in the course of about four hours during which time only slight evaporation occurred. With a constant input of heat, the oven temperature remained at this temperature from the fourth to the tenth hour of the heating cycle, during which time evaporation of the free moisture in the film and in the pores of the porcelain rods was completed. During this entire drying period, the atmosphere in the oven was maintained just below its saturation point with respect to water vapor. A slight positive pressure due to the evaporating moisture existed in the oven, the escape of vapors from the oven through the ¼" vent hole being assisted by this slight positive pressure. Because of the constant temperature in the oven and the slow rate of evaporation of moisture, substantially no temperature gradients existed in the porcelain rods or in the catalytic film during the drying operation.

After the completion of the evaporation of free moisture, heating was continued and the temperature in the oven rose more rapidly, causing decomposition of the aluminum nitrate crystals, which were deposited by the evaporation of the moisture, at an increasing rate until substantially all of the aluminum nitrate was converted to catalytic alumina. This substantially complete conversion occurred over a period of about another six hours, final oven temperature being about 500° F. During the decomposition of the aluminum nitrate the nitrogen oxide fumes produced by the decomposition were removed from the oven through the small ¼" vent and exhausted to the atmosphere.

After sixteen hours, the power was shut off and the vent holes 16 in the furnace wall were opened to admit air and to permit the atmosphere in the oven to be purged through line 12.

The film of catalytic alumina produced in this manner is about .003" in thickness and is dense and hard and resistant to abrasive and erosive influences. It shows no tendency to chalk and may be impregnated with catalytic materials such as platinum, silver, palladium, copper, etc. without any loss of these desirable characteristics. If on the other hand, the film of alumina were dried according to conventional drying procedures, the final film is very often chalky in nature and tends to be rapidly removed from the porcelain support by relatively mild erosive influences.

Excellent oxidation catalysts may be prepared from the alumina-coated units produced according to the foregoing example by impregnating the film of alumina with a small amount of a catalytic metal having oxidation activity, such as with 1% to 2% by weight of platinum based on the weight of the alumina film. This may be done for example by dipping the alumina-coated structure into a 1% by weight solution of chloroplatinic acid, drying, and decomposing the salt into platinum by heat. Other metals, such as palladium, silver, copper, ruthenium, nickel or cobalt may be substituted for the platinum.

EXAMPLE II

This example illustrates a specific procedure for preparing pellets of catalytic alumina. Before shaping into pellets, the calcined catalytic alumina was subjected to a severe and prolonged colloidizing operation to reduce the alumina to a very finely divided condition. Following this procedure, to the colloidized alumina mixed with about an equal weight of water, there was added 10% by weight of aluminum nitrate crystals (based on total weight of alumina plus water). The slurry of finely divided alumina particles dispersed in the resulting aluminum nitrate solution was then subjected to a slow evaporation procedure to reduce the moisture content to a point at which the mass of alumina particles took on a doughy consistency.

This material was then molded by extrusion into small pellets of .086" diameter, consisting of the finely divided catalytic alumina homogeneously moist with the aluminum nitrate solution.

The pellets thus produced were loaded into an oven of a type illustrated in Fig. 1, which was then sealed and the same heating cycle described in Example I carried out. The heating oven was filled with a sufficient volume of moist catalyst so that the oven atmosphere became very nearly saturated with water vapor before any appreciable evaporation of moisture from the pellet occurred.

For the purposes of comparison, another batch of pellets of catalytic alumina prepared in identical fashion were first air dried at room temperature and then heated in an ordinary convention type oven to drive off residual moisture and to decompose the aluminum nitrate into catalytic aluminum oxide. Attrition tests were then conducted on the pellets dried in this fashion and those subjected to drying in accordance with the method of the invention. These tests were conducted by placing samples of the two types of pellets in a test machine where the pellets were subjected to agitation over a prolonged period. As the test proceeded, weight measurements were taken from time to time to determine the loss due to attrition. The results of these tests are tabulated below:

Table I

| Hours in Test Machine | Attrition loss, wt. percent | |
|---|---|---|
| | Pellets dried by Special Technique, percent | Pellets dried by Conventional Method, percent |
| 100 | 1 | 6 |
| 200 | 2.5 | 12 |
| 300 | 4 | 18 |
| 400 | 6 | 22 |
| 500 | 8 | 24 |
| 600 | 10 | 27 |

The pellets of alumina or other catalytic oxide thus produced may be used as carriers or supports for many different types of catalytic metals as is well known in the art of catalysis. For example, good oxidation catalysts may be produced by impregnating alumina pellets with metals such as platinum, palladium, silver or the like.

The invention will find general application in the production of catalytic structures from the various catalytic inorganic oxides which are well known in the art of catalysis. The invention is particularly applicable to the production of catalytic structures from catalytic alumina or from composites of catalytic alumina with other catalytic oxides, such as silica-alumina, beryllia-alumina, thoria-alumina or magnesia-alumina composites. The production of catalytic structures from magnesia, beryllia, thoria, silica alone or mixtures of these with one another are also included within the scope of the invention.

It is of course well known in the art that not every form of these inorganic oxides possesses catalytic qualities. It is well known, for example, that only certain forms of alumina are catalytic in nature and that some forms, such as the so-called alpha alumina, possess little or no catalytic properties. The catalytic form of these oxides is characterized by a minute porous structure which possesses a large internal surface area. Almost invariably, the catalytic form of the oxide does not occur as such in nature but must be prepared synthetically or by the so-called activation of a natural occurring form. Catalytic alumina, for example, may be prepared synthetically by precipitating an alumina gel from a solution of an aluminum salt, drying the gel, and thereafter heating carefully at a temperature no higher than about 2000° F. to dispel the hydrated water and to produce a substantially anhydrous oxide which is usually referred to as gamma alumina. Catalytic alumina may be also prepared from a naturally occurring bauxite, which contains hydrated alumina, by heating at a temperature below 2000° F. This heating procedure at a controlled temperature to drive off the hydrated water is ordinarily termed activation. As used herein, the term "catalytic" as applied to alumina or any other similar inorganic oxide, is intended to refer to an alumina or other inorganic oxide which has already been activated, or is capable of being activated to produce the catalytic form.

Preferably, before being deposited as a film or molded into pellets, the catalytic oxide, in an activated form, is reduced to a very finely divided condition by a colloidizing operation such as is described in copending application Serial No. 340,230 previously referred to. As more particularly described in this application, the colloidizing is preferably effected by wet grinding in an aqueous vehicle until the oxide has been reduced to a condition so that it forms a viscous mass when in admixture with an approximately equal volume of water.

Any compound which decomposes fairly readily into a catalytic oxide, and which has a relatively good water solubility, may be used for making up the aqueous solution which impregnates the catalytic film or pellet before drying and which on decomposition in situ provides a binding or welding effect on the catalytic mass. Water soluble salts of alumina, particularly aluminum nitrate, are particularly desirable for this purpose. Water soluble salts of beryllium, thorium, and magnesium, although generally not as desirable as aluminum salts, may also be used. The nitrates of these metals generally give the best results, having good water solubility and decomposing relatively easily at reasonably low temperatures. Other suitable salts of these metals include, for example, the water soluble sulphates, chlorides, and bromates.

While the invention has been illustrated particularly with reference to a batch drying process, it is to be understood that a continuous drying operation, employing the principles of the invention, may also be used. It is understood that this and other modifications which readily occur to those skilled in the art are also included within the scope of the invention.

We claim:

1. A method for producing catalytic structures of superior hardness, resistance to attrition, shocks, abrasion and the like which comprises the steps of producing a coherent mass of fine particles of a catalytic inorganic oxide homogeneously moist with an aqueous solution of a water soluble salt of a member selected from the group consisting of aluminum, beryllium, thorium and magnesium which is decomposable into a catalytic inorganic oxide, drying said mass by heating the mass in an enclosed space such that water vapor produced by evaporation of moisture in said mass accumulates within said space, controlling the release of water vapor from said enclosed space through a restricted venting from said space to the atmosphere such that a slight positive pressure is created in said enclosure by the evaporating vapor by virtue of which said vapor escapes to the atmosphere, thereby maintaining the atmosphere in said enclosed space just below its saturation point with respect to water vapor, and thereafter decomposing said compound into a catalytic inorganic oxide.

2. A method in accordance with claim 1 in which the catalytic mass to be dried comprises a support having deposited thereon a thin film comprised of fine particles of a catalytic inorganic oxide homogeneously moist with an aqueous solution of a water soluble salt of a member selected from the group consisting of aluminum, beryllium, thorium and magnesium which is decomposable into a catalytic inorganic oxide.

3. A method in accordance with claim 1 in which the catalytic mass to be dried comprises a molded pellet comprised of fine particles of a catalytic inorganic oxide homogeneously moist with an aqueous solution of a water soluble salt of a member selected from the group consisting of aluminum, beryllium, thorium and magnesium which is decomposable into a catalytic inorganic oxide.

4. A method for producing catalytic structures of superior hardness, resistance to attrition, shocks, abrasion and the like which comprises the steps of producing a coherent mass comprised of fine particles of a catalytic inorganic oxide homogeneously moist with an aqueous solution of a water soluble salt of a member selected from the group consisting of aluminum, beryllium, thorium and magnesium which is decomposable into a catalytic inorganic oxide, drying said mass by heating the mass in an enclosed space such that water vapor produced by evaporation of moisture in said mass accumulates within said space, controlling the release of water vapor from said enclosed space through a restricted venting from said space to the atmosphere such that a slight positive pressure is created in said enclosure by the evaporating vapor by virtue of which said vapor escapes to the atmosphere, thereby maintaining the atmosphere in said enclosed space just below its saturation point with respect to water vapor during the drying operation, while controlling the application of heat such that during drying substantially no temperature gradients exist in the catalytic structure being dried, and thereafter decomposing said compound into a catalytic inorganic oxide.

5. In the production of a catalytic structure comprising an inert support composed of a relatively dense high quality porcelain having deposited thereon a relatively thin superficial film of catalytic alumina, a method for producing an alumina film of superior hardness, resistance to attrition, shocks, abrasion and the like, which comprises the steps of depositing on said porcelain support a thin film comprised of fine particles of alumina homogeneously moist with an aqueous solution of an aluminum salt decomposable by heat into catalytic alumina, drying said structure by heating it in an enclosed space such that water vapor produced by evaporation of moisture in said structure accumulates within said space, controlling the release of water vapor from said enclosed space through a restricted venting from said space to the atmosphere such that a slight positive pressure is created in said enclosure by the evaporating vapor by virtue of which said vapor escapes to the atmosphere, thereby maintaining the atmosphere in said enclosed space just below its saturation point with respect to water vapor during the drying operation, while at the same time avoiding gas currents over the surface of said catalyst, and controlling the application of heat such that during drying substantially no temperature gradients exist in said catalytic structure, and thereafter decomposing said aluminum salt by heat into catalytic alumina.

References Cited in the file of this patent

UNITED STATES PATENTS

| | | |
|---|---|---|
| 2,397,350 | Hayden et al. | Mar. 26, 1946 |
| 2,492,167 | Marisic et al. | Dec. 27, 1949 |
| 2,528,767 | Marisic | Nov. 7, 1950 |
| 2,580,806 | Malina | Jan. 1, 1952 |
| 2,665,258 | Lebeis | Jan. 5, 1954 |
| 2,688,002 | Milliken | Aug. 31, 1954 |
| 2,746,935 | Weisz | May 22, 1956 |
| 2,767,148 | Plank | Oct. 16, 1956 |